US012639632B2

(12) United States Patent　　(10) Patent No.: US 12,639,632 B2
Sardina et al.　　　　　　　　　(45) Date of Patent: May 26, 2026

(54) SYSTEMS AND METHODS FOR ENHANCING AN ARTIFICIAL INTELLIGENCE MODEL VIA A MULTI-FIELD EMBEDDING APPROACH

(71) Applicant: Accenture Global Solutions Limited, Dublin (IE)

(72) Inventors: Jeffrey Sardina, Dublin (IE); Alberto Bernardi, Dublin (IE); Christophe Gueret, Dublin (IE)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 538 days.

(21) Appl. No.: 18/351,959

(22) Filed: Jul. 13, 2023

(65) Prior Publication Data

US 2025/0021871 A1　　Jan. 16, 2025

(51) Int. Cl.
*G06N 20/00*　　(2019.01)
*G06N 5/02*　　(2023.01)

(52) U.S. Cl.
CPC ............... *G06N 20/00* (2019.01); *G06N 5/02* (2013.01)

(58) Field of Classification Search
CPC ........... G06N 20/00; G06N 5/02; G06N 3/045
See application file for complete search history.

*Primary Examiner* — Pei Yong Weng
(74) *Attorney, Agent, or Firm* — Mannava & Kang, P.C.

(57) ABSTRACT

The present disclosure provides a framework for enhancing artificial intelligence models while reducing its memory requirements, for example, via a multi-field embedding approach. In one exemplary aspect, this framework may be applied to knowledge graphs to mitigate the effects of node degree extremity and to reduce embedding memory demand. For example, this framework may provide multiple graph fields in knowledge graphs that embed nodes in different dimensions to correct for skewness in the distribution of node degrees and decrease memory requirements when training KGE models. In some aspects, the framework may implement a user-specified strategy to split a knowledge graph into a number of distinct fields with similar connectivity patterns. KGEs may then be computed in a model-agnostic manner to allow each field to embed into a different dimensionality, and mathematical transformations may be used to convert embedding dimensions between fields when needed during algorithmic processing.

20 Claims, 4 Drawing Sheets

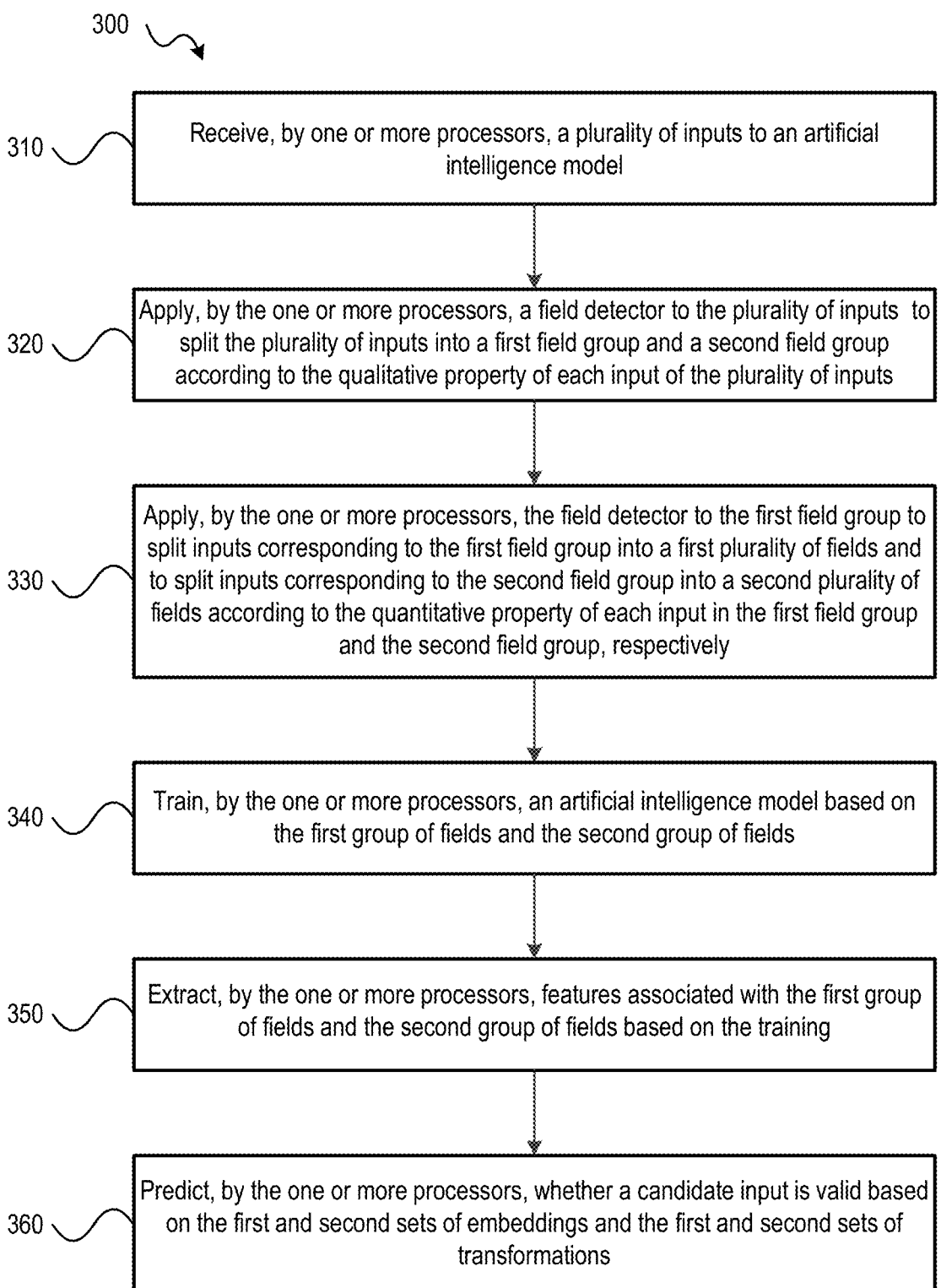

300

310 — Receive, by one or more processors, a plurality of inputs to an artificial intelligence model 320 — Apply, by the one or more processors, a field detector to the plurality of inputs to split the plurality of inputs into a first field group and a second field group according to the qualitative property of each input of the plurality of inputs 330 — Apply, by the one or more processors, the field detector to the first field group to split inputs corresponding to the first field group into a first plurality of fields and to split inputs corresponding to the second field group into a second plurality of fields according to the quantitative property of each input in the first field group and the second field group, respectively 340 — Train, by the one or more processors, an artificial intelligence model based on the first group of fields and the second group of fields 350 — Extract, by the one or more processors, features associated with the first group of fields and the second group of fields based on the training 360 — Predict, by the one or more processors, whether a candidate input is valid based on the first and second sets of embeddings and the first and second sets of transformations

FIG. 3

SYSTEMS AND METHODS FOR ENHANCING AN ARTIFICIAL INTELLIGENCE MODEL VIA A MULTI-FIELD EMBEDDING APPROACH

TECHNICAL FIELD

The present disclosure generally relates to enhancing artificial intelligence models and more specifically to enhance performance and reduce memory requirements for artificial intelligence models, for example, via a multi-field embedding approach.

BACKGROUND

As artificial intelligence technologies continue to advance, both in terms of capabilities and functionalities, the utilization of artificial intelligence technologies has also expanded. Machine learning models, such as graph machine learning, are being deployed in numerous fields of applications, like processing biomedical datasets to develop diagnostics. As an example, graph machine learning is a family of machine learning methods designed to learn from graph datasets with the goal of inferring missing information (typically this means predicting missing edges between nodes of a graph). Graph machine learning includes node representation learning models based on graph features, graph neural networks (GNN), and neural link predictors.

Neural link predictor is also known as Knowledge Graph Embedding model (KGE). KGE is an artificial neural network architecture that learns vector representations ("embeddings") of concepts from a training knowledge graph $G$ to predict missing, unseen links between nodes (e.g., ComplEx and TransE). The architecture of a conventional Neural Link Predictor (or KGE) includes: 1) input layer, 2) corruption generation layer, 3) embedding, 4) embedding lookup layer, 5) scoring layer, and 6) loss layer. For the input layer, the knowledge graph is fed to the model at this layer in the form of a triple (also known as an input triple). Each triple is represented as <s.p.o> where s and o are subject (also referred to as a head) and object (also referred to as a tail) entities, p is the predicate (also referred to as a relationship). For the corruption generation layer, this layer takes the input triple and generates "corruptions" by randomly replacing either the subject or object with a random entity from the graph. Corruptions (also known as "synthetic negatives") are required to train the neural link predictor model. A corruption heuristics typically generates negative triples (i.e., "synthetic negatives") by replacing either the subject or the object of a triple, to create implausible facts (see example in the description below):

Synthetic Negatives: Example, with Selected and Exemplary Corruptions ($C_t$)

$\in$={Mike, Liverpool, AcmeInc, George, LiverpoolFC}
$\mathcal{R}$={bornIn, friendWith}
$G \ni$ t={Mike bornIn Liverpool}

| $C_t=$ | | |
|---|---|---|
| Mike | bornIn | AcmeInc |
| Mike | bornIn | LiverpoolFC |
| George | bornIn | Liverpool |

-continued

| $C_t=$ | | |
|---|---|---|
| AcmeInc | bornIn | Liverpool |
| Liverpool | bornIn | AcmeInc |

In the example above, $G$ is a graph made of entities $\varepsilon$ and relationships (or predicates) $\mathcal{R}$, t denotes a triple, and $C_t$ denotes the corruptions of triples.

For embedding, an embedding may be defined as a k-dimensional vector of numbers (e.g., real, imaginary and/or complex numbers) that represents either a node (e.g., "Cancer" in FIG. 4) or an edge type (e.g., "Prevents" in FIG. 4). Embeddings are learned by artificial neural networks and serve as their internal representation for the concept learned from the input knowledge graph. Embeddings learned by neural link predictors may have an exemplary dimensionality of 100<k<500 (which means they may be arrays of 100 to 500 numbers), and lower or higher dimensionality may also be used. Embeddings are the model weights learned by the neural link predictor, as its learned parameters. For the embedding lookup layer, this layer looks up the embeddings of the entities and predicates of the triple and corruptions. For the scoring layer, this layer takes in the embeddings of the positive triple and its corruptions and scores it using scoring functions such as TransE, ComplEx, DistMult, etc. The higher the score, the higher the chances the triple is factually correct. The scoring layer can be considered as a way to assign a plausibility score to each fact of the knowledge graph. Existing methods propose scoring functions that rely on different intuitions: For example, TransE relies on distances, DistMult and ComplEx are bilinear-diagonal models, HolE uses circular correlation. For the loss layer, this layer uses the scores of the positive triple and their corruptions and computes the loss.

State of the art KGEs approaches require a large (typically several hundred) dimensions in vector space to accurately represent the different nodes. Furthermore, these approaches also exhibit inconsistent performance correlated with the degree of nodes. One problem that remains to be solved may be phrased as: How might the KGE methodology be adapted to reduce its memory footprint and stabilize its performance across the graph for link prediction tasks? This problem encompasses two specific unmet needs, which are further elaborated as below.

Knowledge graphs typically show a very skewed degree distribution, with few high degree nodes and a long tail of low degree nodes. When training existing KGE models on such datasets, the resulting embeddings tend to be of good quality for high degree nodes (which are over-represented in triples), while embeddings for low degree nodes tend not to be expressive enough (as their under-representation in the data makes the available information scarce). As a consequence, encoding the two different types of nodes in a one-size-fits-all embedding would either limit the information embedded for high degree nodes or exceed the information needed by low degree nodes. Thus, the first unmet need can be described as: How to ensure low- and high-degree nodes in a graph to obtain the same performance in link prediction task as those with more average degrees.

An example is described herein to further illustrate the this unmet need. The sample knowledge graph in FIG. 4 shows various processes and molecules related to cancer as an example. Low-degree nodes, high-degree nodes, and middling-degree nodes are indicated in the legend. As typically happens in knowledge graphs, there are many low-degree nodes, while high-degree nodes are the least common. In a KGE trained on the graph, it should be reasonably easy to predict the correct triples: (SIRT1, Prevents, Apoptosis) and (P53, Promotes, Apoptosis)—after all, the node involved has middling degree, so there are some examples of it in the graph. However, if an attempt is made to predict (SIRT1, Inhibits, ???), there would be much less information to use for this prediction—meaning that it will be generally more difficult. Even though SIRT1 is high-degree, there is no other information on HIF1a in the graph. As such, a KGE model would be likely to err in this prediction. On the other hand, predicting (SIRT1, Prevents, Cancer) is much easier. A KGE model has the full context of both SIRT1 and Cancer, and has much more data it can draw on to make that prediction. Thus, it is more likely to make that prediction accurately.

Furthermore, the KGE approach requires a high dimensional space. Each node is projected as a vector of, generally, several hundred dimensions. The memory requirement is thus proportional to the number of nodes times the size of each individual vector, a large and dense matrix of data. Considering that higher dimensions are required to have more room to express the complexity in the data, this observation can be related to the previous point on varied complexity. Thus, the second unmet need can be described as: How to reduce the total computer memory required to run KGEs for the link prediction task by leveraging the difference of representation across the nodes.

SUMMARY

The present disclosure provides a framework for enhancing an artificial intelligence model while reducing its memory requirements, for example, via a multi-field embedding approach. This framework may be applied to a variety of artificial intelligence models. In one exemplary aspect, this framework may be applied to knowledge graphs to mitigate the effects of node degree extremity and to reduce embedding memory demand. For example, this framework may provide multiple graph fields in knowledge graphs that embed nodes in different dimensions to correct for skewness in the distribution of node degrees and decrease memory requirements when training KGE models. In some aspects, the framework may implement a user-specified strategy to split a knowledge graph (including all of its inputs) into a number of distinct fields with similar connectivity patterns. KGEs may then be computed in a model-agnostic manner to allow each field to embed into a different dimensionality, and mathematical transformations may be used to convert embedding dimensions between fields when needed during algorithmic processing.

The present disclosure also provides systems, methods, and non-transitory computer-readable medium relating to this framework for enhancing an artificial intelligence model while reducing its memory requirements, for example, via a multi-field embedding approach. In some aspects, this framework includes the following aspects: receiving, by one or more processors, a plurality of inputs to an artificial intelligence model, wherein each input of the plurality of inputs comprises a qualitative property and a quantitative property; applying, by the one or more processors, a field detector to the plurality of inputs to split the plurality of inputs into a first field group and a second field group according to the qualitative property of each input of the plurality of inputs, wherein the first field group and the second field group are associated with different qualitative properties; applying, by the one or more processors, the field detector to the first field group to split inputs corresponding to the first field group into a first plurality of fields and to split inputs corresponding to the second field group into a second plurality of fields according to the quantitative property of each input in the first field group and the second field group, respectively; training, by the one or more processors, an artificial intelligence model based on the first plurality of fields and the second plurality of fields; extracting, by the one or more processors, features corresponding to the first plurality of fields and the second plurality of fields based on the training, wherein the features comprise a first set of transformations, a second set of transformations, a first set of embeddings, and a second set of embeddings, with the first set of transformations and the first set of embeddings corresponding to the first plurality of fields and the second set of transformations and the second set of embeddings corresponding to the second plurality of fields, wherein the first and second sets of embeddings are learned during the training, wherein the first set of transformations are configured to convert the first set of embeddings to a first uniform dimension, and wherein the second set of transformations are configured to convert the second set of embeddings to a second uniform dimension; and predicting, by the one or more processors, whether a candidate input is valid based on the first and second sets of embeddings and the first and second sets of transformations.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific aspect disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the disclosed systems, methods, and non-transitory computer-readable medium, reference should be made to the aspects illustrated in greater detail in the accompanying drawings, wherein:

FIG. 3 is a flow diagram illustrating an exemplary method for enhancing an artificial intelligence model in accordance with aspects of the present disclosure.

It should be understood that the drawings are not necessarily to scale and that the disclosed aspects are sometimes illustrated diagrammatically and in partial views. In certain instances, details which are not necessary for an understanding of the disclosed systems, methods, and non-transitory computer-readable medium or which render other details difficult to perceive may have been omitted. It should be understood, of course, that this disclosure is not limited to the particular aspects illustrated herein.

DETAILED DESCRIPTION

Aspects of the present disclosure provide a framework for enhancing an artificial intelligence model while reducing its memory requirements, for example, via a multi-field embedding approach. Inputs may be received and prepared for processing by an artificial intelligence model. A field detector may be used to first split the inputs based on their qualitative property into one or more field groups, and the inputs within each field group may be subsequently split by the field detector into a plurality of fields based on each input's quantitative property. The artificial intelligence model may be trained by the inputs from each plurality of fields, and features corresponding to each plurality of fields based on the training may be extracted to include a set of transformations, a set of embeddings corresponding to each plurality of fields, and a set of performance metrics. The set of transformations for each plurality of fields may be configured to convert the set of embeddings in the same plurality of fields to a uniform dimension and processed together with other plurality or pluralities of fields upon similar conversions. The artificial intelligence model may then be used to predict whether a candidate input is valid based on each set of embeddings and the each sets of transformations. As described in more detail below, the disclosed framework enables the artificial intelligence model to operate and perform in a manner that is significantly more accurate than existing techniques and also reduces the memory requirements of the model as compared to conventional approaches described above.

Figure 1:
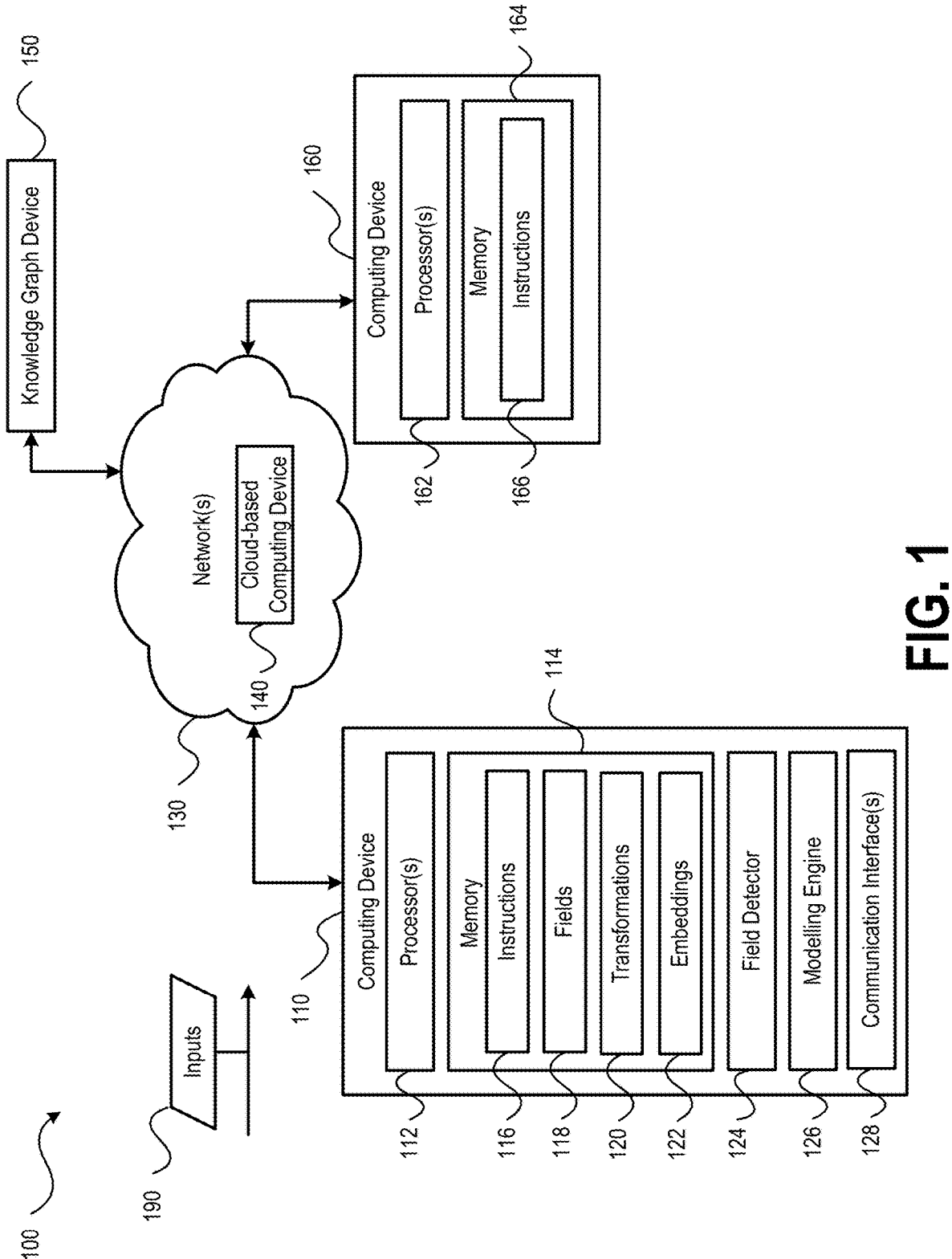
FIG. 1 is a block diagram illustrating a system for enhancing an artificial intelligence model in accordance with aspects of the present disclosure.

Referring to FIG. 1, a block diagram illustrating a system for enhancing an artificial intelligence model in accordance with aspects of the present disclosure is shown as a system 100. The system 100 includes a computing device 110 that provides functionality that supports construction of dynamic-dimension, degree-aware, and reduced-memory KGE models. For example, the functionality of the computing device 110 may define a small number of graph fields which all receive different dimensions for embedding based on the range of degrees available in that field. Additionally, the functionality of the computing device 110 may support use of graph fields with lower degrees that may be embedded into lower dimensions, which means that the total memory needed to store their embedding is decreased. Exemplary details for providing the above-described functionality are explained in more detail below. As shown in FIG. 1, the computing device 110 includes one or more processors 112, a memory 114, a field detector 124, a modelling engine 126, and one or more communication interfaces 128. The one or more processors 112 may include a central processing unit (CPU) or other computing circuitry (e.g., a microcontroller, one or more application specific integrated circuits (ASICs), and the like). The one or more processors 112 may also include one or more graphics processing units (GPUs). As described in more detail with reference to FIG. 2, the functionality provided by the field detector 124 and the modelling engine 126 may be executable by the one or more processors 112, such as for splitting inputs into fields, for extracting features corresponding to the fields including transformations and embeddings, and for predicting whether a candidate input is valid based on the transformations and embeddings. In one aspect, each input in the inputs 190 may include at least one qualitative property and at least one quantitative property.

The memory 114 may include read only memory (ROM) devices, random access memory (RAM) devices, one or more hard disk drives (HDDs), flash memory devices, solid state drives (SSDs), other devices configured to store data in a persistent or non-persistent state, or a combination of different memory devices. The memory 114 may store instructions 116 that, when executed by the one or more processors 112, cause the one or more processors 112 to perform the operations described in connection with the computing device 110 with reference to FIGS. 1-3. For example, the instructions 116 may include instructions that, when executed by the one or more processors 112, provide the functionality described herein with respect to the field detector 124 and the modelling engine 126. In addition to the instructions 116, the memory 114 may also store other types of information, such as a plurality of fields 118 and a plurality of embeddings 122.

The field detector 124 may be configured to split the inputs 190, based on the instructions 116, into a first field group and a second field group according to the qualitative property of each input of the inputs 190, and the first field group and the second field group may be associated with different qualitative properties. The first field group and the second field group may be stored in memory 114 as a part or all of the plurality of fields 118. Upon splitting by the field detector 124, each input of the inputs 190 may be placed in a field with other inputs of similar quantitative property. As a non-limiting example, the field detector 124 may enable a quantitative property of the inputs 190 to be explicitly modelled by the modelling engine 126 and a varying amount of information may be learned based on the explicit modelling.

After splitting is completed (e.g., based on both qualitative and quantitative properties of the inputs 190), inputs in the first plurality of fields and the second plurality of fields may be used to train an artificial intelligence model. The modelling engine 126 may be configured to extract features associated with the first plurality of fields and the second plurality of fields based on the training. The extracted features may include transformations, embeddings, and performance metrics. As a non-limiting example, the transformations may be used to convert the embeddings from different dimensions into one or more uniform dimensions, so that the system 100 may be applied to or compatible with traditional KGE systems to perform link prediction. The performance metrics may be used to inform the training progress or completion status for a KGE system under training. The functionality and operations of the field detector 124 and the modelling engine 126 are described in more detail below with reference to FIG. 2.

The exemplary functionality of the field detector 124 and the modelling engine 126 described briefly above and in more detail below provides several benefits. For example, inputs with low quantitative properties may be correlated with low information content and thus may be given small embedding dimensions and may require less memory space, and as a result may consume less memory space when stored in the memory 114. It is noted that, however, the value of a quantitative property may be either positively or negatively correlated with the volume of information content and that allocation of embedding dimensions may be adjusted accordingly to realize the same benefit of reducing memory space consumption. As another exemplary benefit, the functionality of the field detector 124 may enable link prediction in KGE models to be performed more accurately due to the ability to account for different dimensionalities with respect to the node embeddings (e.g., different dimensionalities for low degree, middling degree, high degree, etc.) during training, thereby enabling the training to be performed in a manner that can account for differences in the dimensionality of the datasets and resulting in a model that can more accurately perform link prediction (e.g., improved link prediction for low degree nodes). Furthermore, the resulting models may utilize the transformations to provide uniform dimensions when performing link prediction.

The one or more communication interfaces 128 may communicatively couple the computing device 110 to one or more other devices, such as an knowledge graph device 150 and a computing device 160 via one or more networks 130. In an aspect, the computing device 110 may be communicatively coupled to a cloud-based computing device 140 via wired or wireless communication links according to one or more communication protocols or standards (e.g., an Ethernet protocol, a transmission control protocol/internet protocol (TCP/IP), an institute of electrical and electronics engineers (IEEE) 802.11 protocol, and an IEEE 802.16 protocol, and the like).

As shown in FIG. 1, the computing device 160 may include one or more processors 162 and a memory 164. The one or more processors 162 may include one or more CPUs, one or more GPUs, or other computing circuitry (e.g., a microcontroller, one or more ASICs, and the like). The memory 164 may include ROM devices, RAM devices, one or more HDDs, flash memory devices, SSDs, other devices configured to store data in a persistent or non-persistent state, or a combination of different memory devices.

The computing device 160 may be configured in different ways to leverage the functionality of the computing device 110. In one aspect, the computing device 160 may enable a user to communicate with the computing device 110, such as to utilize the functionality of the computing device 110 to generate or configure KGE models. For example, a user may use the computing device 160 to configure a KGE model and perform link prediction via accessing the computing device 110 over the network(s) 130 (e.g., through a client-server system or a cloud computing architecture) to perform the operations described in connection with the computing device 110 with reference to FIGS. 1-3. It should be understood that the example above demonstrates a user accessing the functionality of the computing device 110 for purposes of illustration, rather than by way of limitation, and that the functionality provided by the computing device 160 may be provided without accessing the computing device 110. For example, the computing device 160 may incorporate some or all aspects of the computing device 110, and the instructions 166 may include instructions that may be executed by the processor(s) 162 to perform the functions described in connection with the computing device 110.

Figure 2:
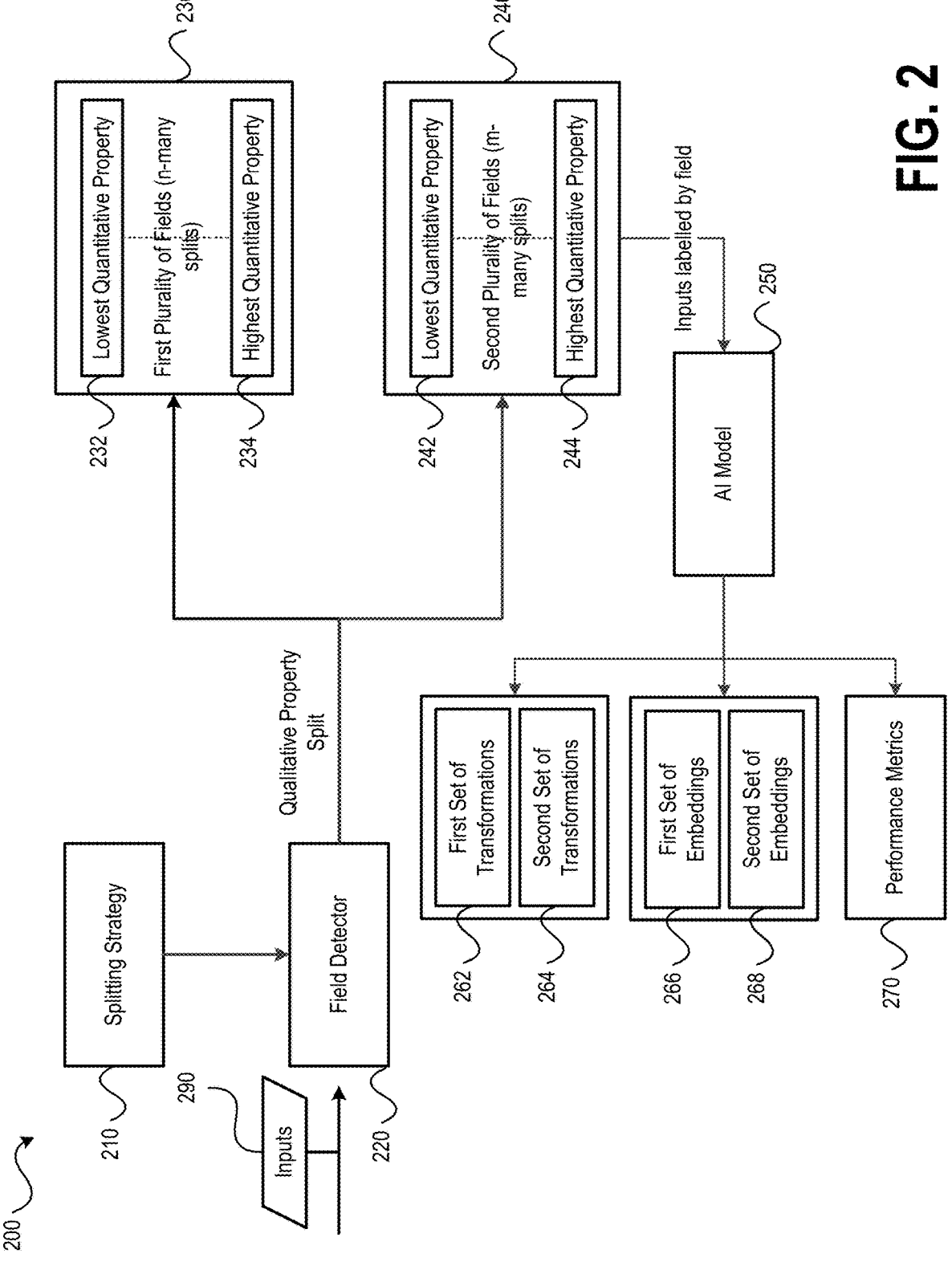
FIG. 2 is a block diagram illustrating an exemplary process for creating artificial intelligence models in accordance with the present disclosure.

Referring to FIG. 2, a block diagram illustrating an exemplary process for creating artificial intelligence models in accordance with the present disclosure. It is noted that the exemplary processes 200 shown in FIG. 2 may be utilized by a computing device, such as the computing device 110 of FIG. 1 to create artificial intelligence models in accordance with the techniques described herein. As a non-limiting example, the artificial intelligence models created using the processes 200 of FIG. 2 may correspond to dynamic-dimension, degree-aware, and reduced-memory KGE models.

As shown in FIG. 2, the processes 200 may receive a plurality of inputs 290. In one aspect, each input of the plurality of inputs 290 may include a qualitative property and a quantitative property. In one aspect, the plurality of inputs may comprise at least two different qualitative properties (e.g., being nodes and being edges in a knowledge graph example). The processes 200 may be configured to apply a field detector 220 (e.g., the field detector 124 of FIG. 1) to the plurality of inputs 290 to split the plurality of inputs into a first field group 230 and a second field group 240 according to the qualitative property of each input of the plurality of inputs, with the first field group 230 and the second field group 240 being associated with different qualitative properties.

Subsequently, the processes 200 may be configured to apply the field detector 220 to the first field group 230 to split inputs corresponding to the first field group 230 into a first plurality of fields (e.g., n-many splits resulting in n-many fields, such as field 232 and field 234) and to split inputs corresponding to the second field group 240 into a second plurality of fields (e.g., m-many splits resulting in m-many fields, such as field 242 and field 244) according to the quantitative property of each input in the first field group and the second field group, respectively. In one aspect, the quantitative property may comprise a numeric value. For example, in the context of a knowledge graph the quantitative property may comprise a numeric value representing a total number of connecting relationships (or edges) of a node, which may be referred to herein as a degree of a node, and/or other measures, such as centrality measures (e.g., PageRank, harmonic centrality, betweenness centrality, eigenvector centrality, closeness centrality, accessibility, Katz's centrality, radiality, and integration). As another example, the quantitative property may comprise a numeric value representing a frequency corresponding to a number of times of appearances of a knowledge graph edge, which may be called a relationship or edge frequency, and/or other measures, such as edge importance measures (e.g., edge support, link betweenness, and random walk betweenness). In an aspect, the quantitative property may comprise numeric values representing both the degree and/or other measures of nodes and the frequency and/or other measures of edges, either respectively or collectively.

As explained above in the background, knowledge graphs typically may show a very skewed degree distribution, with few high degree nodes and a long tail of low degree nodes. When training existing KGE models on such skewed dataset inputs, the resulting embeddings tend to be of good quality for high degree nodes (which are over-represented in triples (subject entity, object entity, and predicate)), while embeddings for low degree nodes tend not to be expressive enough (as their under-representation in the data makes the available information scarce). As a consequence, encoding the two different types of nodes in a one-size-fits-all embedding may either limit the information embedded for high degree nodes or exceed the information needed by low degree nodes. The above described functionality of the processes 200 solves this skewed distribution problem by first splitting the knowledge graph inputs based on their qualitative properties (e.g., being nodes and being edges) and their associated quantitative properties (e.g., degree value and/or other measures of nodes, such as centrality measures (e.g., PageRank, harmonic centrality, betweenness centrality, eigenvector centrality, closeness centrality, accessibility, Katz's centrality, radiality, and integration), and a relationship or frequency value and/or other measures of edges, such as edge importance measures (e.g., edge support, link betweenness, and random walk betweenness). Thus, a number of graph fields may be defined to receive different dimensions for embedding based on the range of degrees available in that field. As further described below, because of the splitting step, graph fields with lower degrees are embedded into lower dimensions, which means that the total memory needed to store their embedding is decreased, thus reducing memory requirements.

In an aspect, the field detector 220 may be configured according to a splitting strategy 210 to effectuate the splitting based on the quantitative properties of the inputs 290. For example, after splitting the inputs 290 according to qualitative properties, each field of the first plurality of fields and/or the second plurality of fields may include inputs having one or more similar quantitative properties. The splitting strategy 210 may be implemented in different ways while accounting for the notion of numeric values of an input's quantitative property. In an aspect, the splitting strategy 210 may account for the quantitative properties of the inputs directly, such as by considering the degree distributions, as described above. In an additional or alternative aspect, the splitting strategy may account for the quantitative properties of the inputs indirectly by considering metrics or centrality measures such as PageRank. For example, the PageRank algorithm is designed to infer an importance of different connected elements based on a number and direction of connections each element has, where the inferred importance may be represented as a probability distribution. For a knowledge graph the connected elements are the nodes of the knowledge graph and the directed connections correspond to the directed edges of the knowledge graph. Using PageRank may infer the importance of a given node based on the number and direction of connections the node has to other nodes such that nodes with a higher in-degree (i.e., nodes with more incoming edges) may be inferred to have higher importance than lower degree nodes.

In an additional or alternative aspect, the splitting strategy 210 may be based on one or more percentile cutoffs. In a knowledge graph example, the splitting strategy 210 (e.g., a heuristic) may split nodes using percentile cutoffs for various degree values (such as taking the bottom a % to be "low-degree" and the top b % to be "high-degree") and/or other measures of nodes (e.g., centrality measures, such as PageRank, harmonic centrality, betweenness centrality, eigenvector centrality, closeness centrality, accessibility, Katz's centrality, radiality, and integration). Additionally or alternatively, the splitting strategy 210 (e.g., a heuristic) may split nodes using fractional falloff for certain measures (e.g., centrality measures, such as PageRank, harmonic centrality, betweenness centrality, eigenvector centrality, closeness centrality, accessibility, Katz's centrality, radiality, and integration). For example, given a centrality distribution that relates a centrality value to the number of nodes having that centrality (or a higher centrality), fractional falloff may be defined with a fraction of x % as the set of next-highest degree nodes that must be added to reach a centrality value that is x % of the current value. To illustrate using a hypothetical example, a fraction of 50% and a maximum centrality value of 100 may create sets of nodes with centralities of 100 to 50, 49 to 25, 24 to 12, etc., each of which may be a separate field output under this exemplary splitting strategy. Analogously, the above examples of splitting strategy 210 for nodes may be adopted to apply to edges based on the edges' frequency values and/or other measures, such as edge importance measures (e.g., edge support, link betweenness, and random walk betweenness). In one aspect, the splitting strategy 210 may be dataset-dependent; therefore, the exact percentiles at which the split should occur, as well as the number of splits, may be left to be configured as one or more algorithmic hyperparameters by a user. Similarly, the use of any other splitting strategy and its configuration may be left to user determination. Additionally or alternatively, the splitting may be based on one or more threshold values, such as node degree values (and/or other measures of nodes) and/or edge frequency values (and/or other measures of edges) in a knowledge graph example. In one aspect, the output upon splitting based on quantitative properties in a knowledge graph example is a labelling of every node/relationship in the graph into exactly one of the splits, such that the split it is in represents a set of nodes of similar degree or a set of relationships with similar frequency. One exemplary benefit of splitting the inputs using the splitting functionality provided by the field detector 220, which may be configured according to a splitting strategy 210, is that each node is placed into a field with nodes of a similar degree, which means that the degree of nodes is explicitly modelled in the system, and that a varying amount of information can be learned for each node (e.g., by having a varying embedding size for each node, the KGE system can embed a varying amount of information for each node based on its degree). The same strategies as described above apply to edges, too.

As explained above with reference to the modeling engine 126 of FIG. 1, the fields or field groups generated based on the splitting functionality described above may be used to train an artificial intelligence model, shown in FIG. 2 as an artificial intelligence model 250. In one aspect, the modeling engine 126 of FIG. 1 may be configured to extract features associated with the first plurality of fields 230 and the second plurality of fields 240 based on the training. It is noted that the training may be performed in one or more iterations and that, in each iteration, the performance metrics 270 may be extracted. The training may be considered complete after the performance metrics 270 reaches a certain threshold or otherwise indicates training completion. The extracted features may also include a first set of transformations 262, a second set of transformations 264, a first set of embeddings 266, and a second set of embeddings 268, with the first set of transformations 262 and the first set of embeddings 266 corresponding to the first plurality of fields 230 and the second set of transformations 264 and the second set of embeddings 268 corresponding to the second plurality of fields 240. The first set of embeddings 266 and the second set of embeddings 268 may be learned during the training, and the first set of transformations 262 are configured to convert the first set of embeddings 266 to a first uniform dimension, and wherein the second set of transformations 264 are configured to convert the second set of embeddings 268 to a second uniform dimension. As an exemplary configuration of the first set of transformations 262 to convert the first set of embeddings 266 to a first uniform dimension, each transformation in the first set of transformations 262 may be learned during the training and comprise one or more parameters that define the transformation (e.g., a transformation matrix). Analogously, a similar exemplary configuration may be applied to the second set of transformations 264. An exemplary use of these transform/transformation matrices is further described as Equation 1 below.

In one aspect, the first set of transformations 262, second set of transformations 264, first set of embeddings 266, and second set of embeddings 268 may be stored in a memory (e.g., the embeddings 122 stored in the memory 114 of FIG. 1). In another aspect, the first set of embeddings 266 may include embeddings with one or more dimensions that have different dimension values, and the second set of embeddings 268 may also include embeddings with one or more dimensions that have different dimension values. A quantitative property value of inputs of the first field group 230 may be positively correlated with an embedding dimension value of the first set of embeddings 266, and a quantitative property value of inputs of the second field group 240 may be positively correlated with an embedding dimension value of the second set of embeddings 268. Additionally or alternatively, a quantitative property value of inputs of the first field group 230 may be negatively correlated with an embedding dimension value of the first set of embeddings 266, and a quantitative property value of inputs of the second field group 240 may be negatively correlated with an embedding dimension value of the second set of embeddings 268. In another aspect, the first set of embeddings 266 may include embeddings with one or more dimensions that are different from the first uniform dimension, and the second set of embeddings 268 may include embeddings with one or more dimensions that are different from the second uniform dimension.

In an example of knowledge graph, low-degree nodes may be embedded into a lower dimension space, and higher-degree nodes may be embedded into increasingly high-dimension spaces (e.g., as the first set of embeddings 266 with reference to FIGS. 1-3). Similarly, low-degree edges may be embedded into a lower dimension space, and higher-degree edges may be embedded into increasingly high-dimension spaces (e.g., as the second set of embeddings 268 with reference to FIGS. 1-3). The exact dimensionality of these spaces may be left as a hyper-parameter to be set by a user. Thus, the overall memory requirement may be reduced in comparison to existing one-size-fits-all embedding strategies, because lower dimension spaces have less memory requirements and do not need to be allotted the same amount of memory for higher dimension spaces. Following this exemplary framework of the present disclosure, a dynamic-dimension, degree-aware, and reduced-memory KGE model may be constructed.

In another aspect, the first set of transformations 262 may be configured to convert one or more embeddings in the first set of embeddings 266 from higher dimension to lower dimension. Additionally or alternatively, the first set of transformations 262 may be configured to convert one or more embeddings in the first set of embeddings 266 from lower dimension to higher dimension. The first uniform dimension may be lower than the dimensions of all embeddings in the first set of embeddings 266, higher than the dimensions of all embeddings in the first set of embeddings 266, or lower than dimensions of some embeddings in the first set of embeddings 266 but higher than dimensions of some other embeddings in the first set of embeddings 266. Analogously, the second set of transformations 264 may be configured in the same or similar manners as the first set of transformations 262 when the second set of transformations 264 are applied to the second set of embeddings 268. In another aspect, the first uniform dimension and the second uniform dimension may or may not be the same dimension. If the first uniform dimension and the second uniform dimension are not the same dimension, a separate transformation may be used to convert the first uniform dimension and the second uniform dimension into a third uniform dimension (e.g., for use in an underlying KGE scoring layer).

In another aspect, the modeling engine may be configured to predict whether a candidate input is valid based on the first set of embeddings 266 and second set of embeddings 268 and the first set of transformation 262 and second set of transformations 264. In an example of a knowledge graph, existing KGE models specify the prediction based on a scoring function, which may be of the form: Score=S=f(h, r,t), with "h" representing head (also referred to as a subject), "r" representing relationship (also referred to as a predicate), and "t" representing tail (also referred to as an object). However, this requires that the embedding dimensions of the head, the relationship, and the tail are the same, since the necessary linear algebra computations (addition, dot product, diagonal matrix multiplication, etc.) may not be defined between vectors of arbitrarily different size. In order to allow for varying embedding dimensions, the above extracted transformations may form a transform matrix for each field, denoted as T, which act as matrix transforms on the embeddings (e.g., head, relationship, and tail vectors) to map them into a different dimensionality. For example, a 3×2 transform matrix multiplied on the right by a 2×1 vector would result in a 3×1 vector output—in other words, a transformation from the latent space in R^2 to the latent space in R^3. An exemplary use of these transform/transformation matrices (e.g., a set of transformations such as the first set of transformations 262 and second set of transformations 264) is shown in the score function in Equation 1:

$$S = f\left(T_i * \vec{h},\, T_j * \vec{r},\, T_k * \vec{t}\right)$$

Equation 1 illustrates modification of the scoring function to use transform matrices T on the head, relation, and tail embedding vectors. Subscripts to T indicate that there may be multiple transform matrices that are used for different conversions, depending on the fields to which head, relationship and tail embedding live. The function f may be the scoring function of any KGE model that embeds nodes and edges into a uniform-dimensional space (common state-of-the-art models, such as TransE, DistMult, ComplEx, RotatE, and many others all fit into this category of KGE models). The vectors h, r, and t represent the embedding vectors of a given triple: its head, relationship, and tail. The transform matrices $T_i$, $T_j$, and $T_k$ are transforms that convert all of the embeddings (e.g., from different fields, meaning they would be in different dimensions) into a uniform dimension.

As one of ordinary skill in the art will readily appreciate, certain aspects of the present disclosure provide a framework, via a multi-field embedding approach, for a use case like a knowledge graph and a KGE model. This framework may work on a vast variety of existing KGE models by allowing each field of nodes and relations to be initialised with different embedding sizes. During the training process, the elements of all the transform matrices may be learned as well as the embeddings of individual vectors, utilizing a process similar to the processes 200 of FIG. 2. Since these transforms allow casting all vectors into the same dimensionality space, the output of these transformations may be fed into the original KGE score function. This may be used, as normal, to generate a loss value, and the loss value may be back-propagated to update not only entity embeddings, but also to update the shared transform matrices. It is noted that transform matrices (e.g., the first set of transformations 262 and second set of transformations 264) generated in accordance with the concepts described herein may be used to cast embeddings (e.g., the first set of embeddings 266 and second set of embeddings 268) into a higher dimension and/or into a lower dimension, when dimensionality changes may be needed or beneficial. The choice of deciding the direction of casting of embeddings (e.g., into a higher dimension or into a lower dimension) may be left for empirical study and end-use cases, without affecting operation of the present disclosure.

In certain aspects, some KGE models, such as RESCAL, some TransE variants, and BoxE, embed entities as matrices or with more than one vector. A framework provided by the present disclosure (e.g., as provided in FIGS. 1, 2, and 3) may be seamlessly applied to these KGE models by using additional transform matrices—for example, converting a matrix from n-by-n to k-by-k uses two transform matrix multiplications, rather than one, but otherwise may be done in the same manner as that described above for transforming vector dimensionalities. Similarly, for models with multiple embeddings, a framework provided by the present disclosure (e.g., as provided in FIGS. 1, 2, and 3) may also be seamlessly applied to such models by having different transform matrices for each embedding in order to conserve the semantics of the original model.

In the exemplary use cases described above, many common biomedical graphs such as Hetionet, as well as many other knowledge graphs from various domains, may have many low-degree nodes and very few high-degree nodes. Low degree nodes, having less context around them, may be generally harder to learn, whereas high-degree nodes may more easily obtain high-quality embeddings. A framework provided by the present disclosure (e.g., as provided in FIGS. 1, 2, and 3) may embed low-degree nodes into a lower dimension space, and higher-degree nodes into increasingly high-dimension spaces. The exact dimensionality of these spaces may be left as a hyper-parameter to be set by a user. When a triple involving nodes of different base embedding dimensions is scored, the transform matrices may be used to convert the dimensions into compatible values for that computation. As explained above, aspects of the present disclosure provide a framework (e.g., as provided in FIGS. 1, 2, and 3) that may be applied to any KGE model that operates by scoring triples based on node and relation embeddings. As such, this framework may be used for any task where KGEs could be applied, such as the link prediction task.

Referring to FIG. 3, a flow diagram illustrating an exemplary method for enhancing an artificial intelligence model in accordance with aspects of the present disclosure. In an aspect, the method 300 may be performed by a computing device, such as the computing device 110 of FIG. 1 and may utilize a process similar to the processes 200 of FIG. 2. In some aspects, steps of the method 300 may be stored as instructions that, when executed by one or more processors (e.g., the one or more processors 112 of FIG. 1), cause the one or more processors to perform the steps of the method 300 to enhance an artificial intelligence model in accordance with the concepts disclosed herein.

At step 310, the method 300 includes receiving, by one or more processors, a plurality of inputs to an artificial intelligence model. Each input of the plurality of inputs may include a qualitative property and a quantitative property, as described above with reference to processes 200 of FIG. 2. In one aspect, the plurality of inputs may comprise at least two different qualitative properties (e.g., being nodes and being edges in a knowledge graph example).

At step 320, the method 300 includes applying, by the one or more processors, a field detector (e.g., the field detector 124 of FIG. 1 and/or the field detector 220 of FIG. 2) to the plurality of inputs to split the plurality of inputs into a first field group and a second field group according to the qualitative property of each input of the plurality of inputs, and the first field group and the second field group may be associated with different qualitative properties, as described above with reference to processes 200 of FIG. 2. In one aspect, the quantitative property may comprise a numeric value (e.g., the total number of connecting relationships in an example of a knowledge graph node, which may be called degree of a node), a frequency (e.g., the number of times of appearances in an example of a knowledge graph edge, which may be called relationship or edge frequency), or a combination thereof.

At step 330, the method 300 includes applying, by the one or more processors, the field detector to the first field group to split inputs corresponding to the first field group into a first plurality of fields and to split inputs corresponding to the second field group into a second plurality of fields according to the quantitative property of each input in the first field group and the second field group, respectively, as described above with reference to processes 200 of FIG. 2. In one aspect, the field detector may adopt a splitting strategy to effectuate the splitting based on a quantitative property of each input. After such splitting, each field of the first plurality of fields and/or the second plurality of fields may include inputs having one or more similar quantitative properties. In one aspect, the splitting strategy may be implemented in different ways while accounting for the notion of numeric values of an input's quantitative property. This may be accomplished either directly (e.g., considering numeric value distribution) or indirectly (e.g., considering metrics such as PageRank). The splitting may be based on one or more percentile cutoffs. In a knowledge graph example, the splitting strategy (e.g., a heuristic) may split nodes using percentile cutoffs for various degree values, such as taking the bottom a % to be "low-degree" and the top b % to be "high-degree." Analogously, the splitting strategy may use percentile cutoffs to split edge relationships based on their frequency. In one aspect, the splitting strategy may be dataset-dependent; therefore, the exact percentiles at which the split should occur, as well as the number of splits, may be left to be configured as algorithmic hyperparameters by a user. Similarly, the use of any other splitting strategy and its configuration may be left to user determination. Additionally or alternatively, the splitting may be based on one or more threshold values, such as node degree values and/or edge frequency values in a knowledge graph example. It is noted that the splitting strategy may also incorporate any of the examples described above with reference to processes 200 of FIG. 2, such as examples and descriptions associated with the splitting strategy 210.

At step 340, the method 300 includes training, by the one or more processors, an artificial intelligence model based on the first plurality of fields and the second plurality of fields, as described above with reference to processes 200 of FIG. 2.

At step 350, the method 300 includes extracting, by the one or more processors, features corresponding to the first plurality of fields and the second plurality of fields based on the training, as described above with reference to processes 200 of FIG. 2. The extracted features may include a first set of transformations, a second set of transformations, a first set of embeddings, and a second set of embeddings, with the first set of transformations and the first set of embeddings corresponding to the first plurality of fields and the second set of transformations and the second set of embeddings corresponding to the second plurality of fields. The first and second sets of embeddings may be learned during the training, and the first set of transformations may be configured to convert the first set of embeddings to a first uniform dimension, and the second set of transformations may be configured to convert the second set of embeddings to a second uniform dimension. In one aspect, the first sets of embeddings may include embeddings with one or more dimensions that are different from the first uniform dimension, and the second sets of embeddings may include embeddings with one or more dimensions that are different from the second uniform dimension. In another aspect, quantitative property value of inputs of the first field group may be positively correlated with embedding dimension value of the first set of embeddings, and quantitative property value of inputs of the second field group may be positively correlated with embedding dimension value of the second set of embeddings. Additionally or alternatively, quantitative property value of inputs of the first field group may be negatively correlated with embedding dimension value of the first set of embeddings, and quantitative property value of inputs of the second field group may be negatively correlated with embedding dimension value of the second set of embeddings. In an example of knowledge graph, low-degree nodes may be embedded into a lower dimension space, and higher-degree nodes may be embedded into increasingly high-dimension spaces. Similarly, low-degree edges may be embedded into a lower dimension space, and higher-degree edges may be embedded into increasingly high-dimension spaces. The exact dimensionality of these spaces may be left as a hyper-parameter to be set by a user.

At step 360, the method 300 includes predicting, by the one or more processors, whether a candidate input is valid. The prediction may be determined based on the first and second sets of embeddings and the first and second sets of transformations, as described above with reference to processes 200 of FIG. 2. In an aspect, the prediction may be represented as a probability indicating a likelihood the input is valid.

Figure 4:
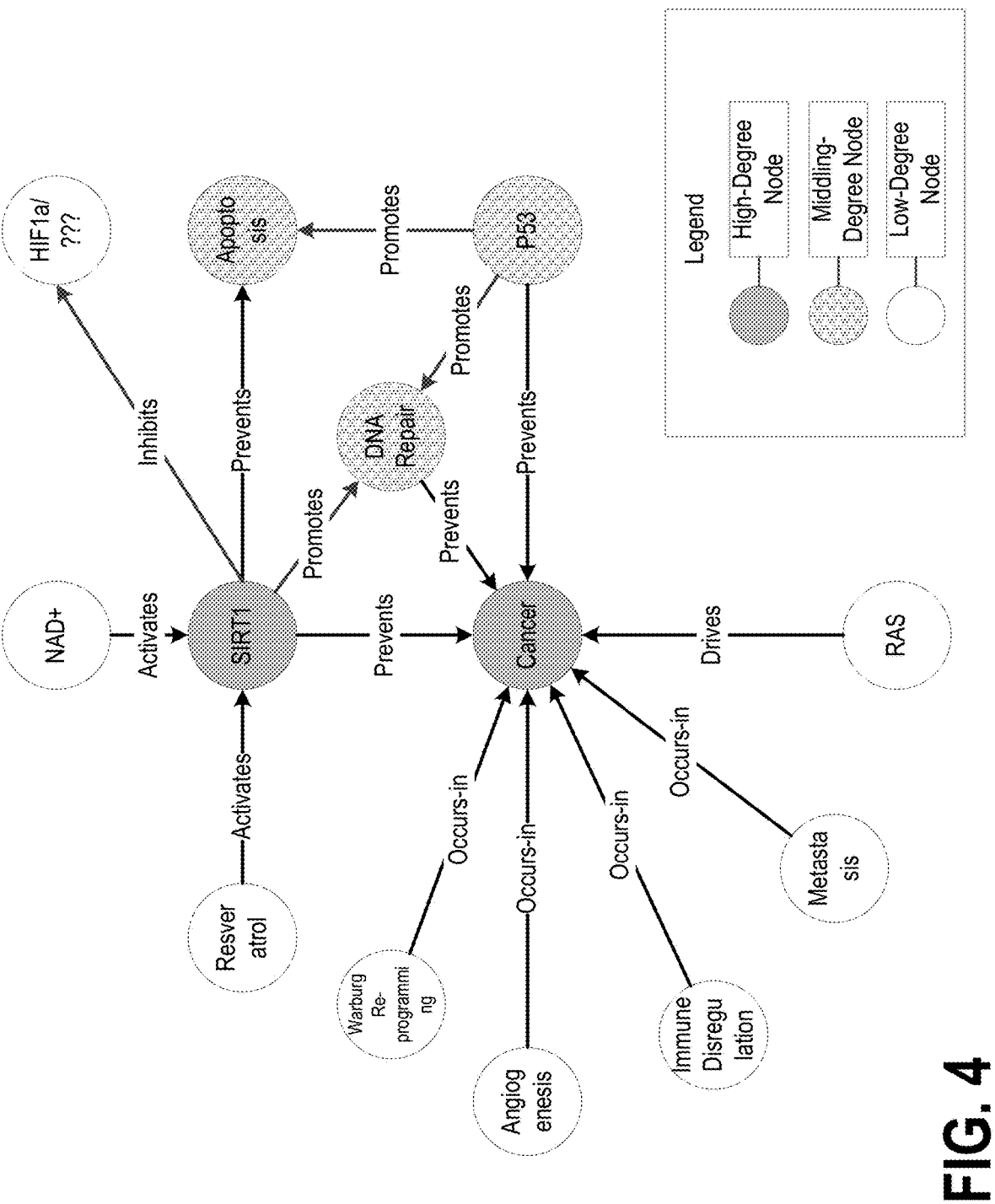
FIG. 4 is a block diagram illustrating an exemplary system for enhancing a knowledge graph with low-degree, middling-degree, and high-degree nodes in accordance with aspects of the present disclosure.

Referring to FIG. 4, a block diagram illustrating exemplary aspects of applying the processes of FIG. 2 to a knowledge graph with low-degree, middling-degree, and high-degree nodes in accordance with aspects of the present disclosure. In one aspect, known nodes and relationships (edges) in FIG. 4 may serve as inputs to train a KGE model as described above with references to FIGS. 1, 2, and 3.

If a KGE model is trained with known data in FIG. 4 without using a framework provided by the present disclosure (e.g., as provided in FIGS. 1, 2, and 3), it may be reasonably easy to predict the correct triples: (SIRT1, Prevents, Apoptosis) and (P53, Promotes, Apoptosis) because the node involved has middling degree and there are some examples of it in the graph. However, if the KGE is used to predict (SIRT1, Inhibits, ???), there would be much less information to use for this prediction—meaning that it will be generally more difficult. Even though SIRT1 is high-degree, there is no other information on HIF1a in the graph. As such, a KGE model would be likely to err in this prediction.

As described above, a framework provided by the present disclosure (e.g., as provided in FIGS. 1, 2, and 3) is designed to solve this problem of lack of reliable prediction for low degree nodes via the multi-field embedding approach described herein. In the example illustrated in FIG. 4 where many low degree nodes exist in a biological or medical knowledge graph, utilizing the present disclosure may enable each node to be placed into a field with nodes of similar degree, so that the degree of nodes is explicitly modelled in the system and a varying amount of information can be learned for each node (e.g., by having a varying embedding size for each node, the KGE system can embed a varying amount of information for each node based on its degree), regardless of whether a node is of low degree or high degree. This may overcome the problem of under-representation of low degree nodes in the resulting embeddings when traditional KGE models are trained. Thus, as an exemplary benefit, the present disclosure may be used to improve reliability and accuracy for predicting new links when applied to knowledge graphs in biological or medical applications or settings. Also, as described in more detail below, the framework provided by the present disclosure reduces memory requirements for an artificial intelligence model (e.g., a KGE model) to operate and perform the predictions.

As one exemplary benefit, the systems and methods described herein may significantly reduce the memory requirements of an artificial intelligence model, such as a KGE model. Indeed, since the largest group of nodes in a graph are typically those with low-degree, and since they are given the smallest embedding dimensions, the space to store node embeddings is drastically diminished. The introduction of transform matrices (e.g., the first set of transformations 262 and second set of transformations 264 of FIG. 2), does not jeopardize this gain, as their memory consumption may be negligible.

As an example, below is an illustrative calculation that shows the impacts of the techniques provided by the present disclosure (e.g., utilizing multi-dimensional field embeddings and transformations) on memory requirements in comparison to an existing KGE system without those techniques.

A biological knowledge graph may have over a billion triples. This often means tens of millions of nodes and thousands of different relation types. Importantly, the skew in node degree distribution is still present in these large graphs, and often with a very long "tail" of low-degree nodes. If there are 100 million nodes and 10,000 relations, there will be slightly over 100 million embedding vectors that need to be represented. If every vector takes, for example, a dimension of 100, then all the embeddings together will require $100 \times 100,000,000 \times 4$ bytes (assuming 32-bit=4 byte numbers are used to represent elements of each vector, as may be standard), which amounts to 40 billion bytes, which equals 37.25 gigabytes (GB). However, if nodes of low degree are at the bottom 25% and need to be represented with embeddings of dimension 25 (to reflect the lesser information they can gather from their locality) and nodes of middling degree (between the 25th and 75th percentiles) are to have dimension 50, and the rest to be high-degree are at dimension 100, then the total memory required using the techniques disclosed herein becomes: $25 \times 25,000,000 \times 4 + 50 \times 50,000,000 \times 4 + 100 \times 25,000,000 \times 4 = 22.5$ billion bytes, which equals 20.95 GB. Thus, by applying the above-described framework and techniques the memory requirements of the KGE model may be reduced by 16.30 GB, representing a substantial reduction in the computational resource (e.g., memory) required for the model.

It is important to note that in this example with three node fields, two transform matrices of various sizes may be needed to convert the embeddings of nodes to the same dimensionality. If all the embedding nodes are upcasted to a dimension of 100, $100 \times 25$ and $100 \times 50$ matrices may be needed. It is noted that the use of a 100×100 matrix, while possible, is not necessary since it may retain the original dimension of the vector in R^100. This means that the total memory transform matrices will take up is: (100×25+100× 50)×4=30,000 bytes, which equals 0.0000279 GB. This increase in memory due to the transform matrices is negligible compared to the 16.30 GB that is saved by allowing embeddings to have variable sizes. It is noted that in addition to the memory reductions provided by the framework and techniques described herein, KGE models utilizing the functionality disclosed herein may enable link prediction to be performed more accurately due to the ability to account for different dimensionalities with respect to the node embeddings (e.g., different dimensionalities for low degree, middling degree, high degree, etc.) during training, and utilizing the transformations to provide uniform dimensions when performing link prediction. Such features may be utilized to overcome the above-described drawbacks associated with traditional KGE systems.

Although the aspects of the present disclosure and their advantages have been described in detail, it should be understood that various changes, substitutions and alterations can be made herein without departing from the spirit and scope of the disclosure as defined by the appended claims. Moreover, the scope of the present application is not intended to be limited to the particular aspects of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding aspects described herein may be utilized according to the present disclosure. Accordingly, the appended claims are intended to include within their scope such processes, machines, manufacture, compositions of matter, means, methods, or steps.

What is claimed is:

1. A method for enhancing an artificial intelligence model, the method comprising:

receiving, by one or more processors, a plurality of inputs to an artificial intelligence model, wherein each input of the plurality of inputs comprises a qualitative property and a quantitative property;

applying, by the one or more processors, a field detector to the plurality of inputs to split the plurality of inputs into a first field group and a second field group according to the qualitative property of each input of the plurality of inputs, wherein the first field group and the second field group are associated with different qualitative properties;

applying, by the one or more processors, the field detector to the first field group to split inputs corresponding to the first field group into a first plurality of fields and to split inputs corresponding to the second field group into a second plurality of fields according to the quantitative property of each input in the first field group and the second field group, respectively;

training, by the one or more processors, an artificial intelligence model based on the first plurality of fields and the second plurality of fields;

extracting, by the one or more processors, features associated with the first plurality of fields and the second plurality of fields based on the training, wherein the features comprise a first set of transformations, a second set of transformations, a first set of embeddings, and a second set of embeddings, with the first set of transformations and the first set of embeddings corresponding to the first plurality of fields and the second set of transformations and the second set of embeddings corresponding to the second plurality of fields, wherein the first and second sets of embeddings are learned during the training, wherein the first set of transformations are configured to convert the first set of embeddings to a first uniform dimension, and wherein the second set of transformations are configured to convert the second set of embeddings to a second uniform dimension; and predicting, by the one or more processors, whether a candidate input is valid based on the first and second sets of embeddings and the first and second sets of transformations.

2. The method of claim 1, wherein the plurality of inputs comprise at least two different qualitative properties.

3. The method of claim 1, wherein the quantitative property comprises a numeric value, a frequency, or a combination thereof.

4. The method of claim 1, wherein, after the splitting, each field of the first plurality of fields and/or the second plurality of fields comprises inputs having one or more similar quantitative properties.

5. The method of claim 4, wherein the splitting is based on one or more percentile cutoffs.

6. The method of claim 4, wherein the splitting is based on one or more threshold values.

7. The method of claim 1, wherein the first sets of embeddings comprise embeddings with one or more dimensions that are different from the first uniform dimension, and wherein the second sets of embeddings comprise embeddings with one or more dimensions that are different from the second uniform dimension.

8. The method of claim 1, wherein quantitative property value of inputs of the first field group is positively correlated with embedding dimension value of the first set of embeddings, and wherein quantitative property value of inputs of the second field group is positively correlated with embedding dimension value of the second set of embeddings.

9. A system for enhancing an artificial intelligence model, the system comprising:

a memory storing a plurality of field groups;

one or more processors communicatively coupled to the memory;

an artificial intelligence model;

a field detector executable by the one or more processors and configured to:

receive a plurality of inputs to the artificial intelligence model, wherein each input of the plurality of inputs comprises a qualitative property and a quantitative property, split the plurality of inputs into a first field group and a second field group according to the qualitative property of each input of the plurality of inputs, wherein the first field group and the second field group are associated with different qualitative properties, and split the first field group to split inputs corresponding to the first field group into a first plurality of fields and to split inputs corresponding to the second field group into a second plurality of fields according to the quantitative property of each input in the first field group and the second field group, respectively;

a modeling engine executable by the one or more processors and configured to:

train the artificial intelligence model based on the first plurality of fields and the second plurality of fields, extract features associated with the first plurality of fields and the second plurality of fields based on the training, wherein the features comprise a first set of transformations, a second set of transformations, a first set of embeddings, and a second set of embeddings, with the first set of transformations and the first set of embeddings corresponding to the first plurality of fields and the second set of transformations and the second set of embeddings corresponding to the second plurality of fields, wherein the first and second sets of embeddings are learned during the training, wherein the first set of transformations are configured to convert the first set of embeddings to a first uniform dimension, and wherein the second set of transformations are configured to convert the second set of embeddings to a second uniform dimension, and predict whether a candidate input is valid based on the first and second sets of embeddings and the first and second sets of transformations.

10. The system of claim 9, wherein the plurality of inputs comprise at least two different qualitative properties.

11. The system of claim 9, wherein the quantitative property comprises a numeric value, a frequency, or a combination thereof.

12. The system of claim 9, wherein, after the splitting, each field of the first plurality of fields and/or the second plurality of fields comprises inputs having one or more similar quantitative properties.

13. The system of claim 12, wherein the splitting is based on one or more percentile cutoffs.

14. The system of claim 12, wherein the splitting is based on one or more threshold values.

15. The system of claim 9, wherein the first sets of embeddings comprise embeddings with one or more dimensions that are different from the first uniform dimension, and wherein the second sets of embeddings comprise embeddings with one or more dimensions that are different from the second uniform dimension.

16. The system of claim 9, wherein quantitative property value of inputs of the first field group is positively correlated with embedding dimension value of the first set of embeddings, and wherein quantitative property value of inputs of the second field group is positively correlated with embedding dimension value of the second set of embeddings.

17. A non-transitory computer-readable medium storing instructions that, when executed by one or more processors, cause the one or more processors to perform operations for enhancing an artificial intelligence model, the operations comprising:

receiving a plurality of inputs to an artificial intelligence model, wherein each input of the plurality of inputs comprises a qualitative property and a quantitative property;

applying a field detector to the plurality of inputs to split the plurality of inputs into a first field group and a second field group according to the qualitative property of each input of the plurality of inputs, wherein the first field group and the second field group are associated with different qualitative properties;

applying the field detector to the first field group to split inputs corresponding to the first field group into a first plurality of fields and to split inputs corresponding to the second field group into a second plurality of fields according to the quantitative property of each input in the first field group and the second field group, respectively;

training an artificial intelligence model based on the first plurality of fields and the second plurality of fields;

extracting features associated with the first plurality of fields and the second plurality of fields based on the training, wherein the features comprise a first set of transformations, a second set of transformations, a first set of embeddings, and a second set of embeddings, with the first set of transformations and the first set of embeddings corresponding to the first plurality of fields and the second set of transformations and the second set of embeddings corresponding to the second plurality of fields, wherein the first and second sets of embeddings are learned during the training, wherein the first set of transformations are configured to convert the first set of embeddings to a first uniform dimension, and wherein the second set of transformations are configured to convert the second set of embeddings to a second uniform dimension; and predicting whether a candidate input is valid based on the first and second sets of embeddings and the first and second sets of transformations.

18. The non-transitory computer-readable medium of claim 17, wherein the plurality of inputs comprise at least two different qualitative properties, wherein the at least two different qualitative properties comprise being nodes and being edges.

19. The non-transitory computer-readable medium of claim 18, wherein the quantitative property of the plurality of inputs being nodes comprises a degree value, a centrality measure, or a combination thereof.

20. The non-transitory computer-readable medium of claim 18, wherein the quantitative property of the plurality of inputs being edges comprises a frequency value, an edge importance measure, or a combination thereof.

* * * * *